(12) United States Patent
Bober

(10) Patent No.: US 8,126,786 B1
(45) Date of Patent: Feb. 28, 2012

(54) NOTIFICATION AND CORRECTION OF E-FILING REJECTIONS

(75) Inventor: Paul M. Bober, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 316 days.

(21) Appl. No.: 11/626,651

(22) Filed: Jan. 24, 2007

Related U.S. Application Data

(60) Provisional application No. 60/870,539, filed on Dec. 18, 2006.

(51) Int. Cl.
  *G06F 17/22* (2006.01)
  *G07F 19/00* (2006.01)
  *G06Q 20/00* (2006.01)
  *G06Q 40/00* (2006.01)

(52) U.S. Cl. .......................... 705/31; 705/19; 705/36 T

(58) Field of Classification Search .................. 705/31
See application file for complete search history.

(56) References Cited

U.S. PATENT DOCUMENTS

| | | | |
|---|---|---|---|
| 5,794,142 A | 8/1998 | Vanttila | |
| 6,151,507 A | 11/2000 | Laiho | |
| 6,181,928 B1 | 1/2001 | Moon | |
| 6,473,609 B1 * | 10/2002 | Schwartz et al. | 455/406 |
| 6,526,524 B1 * | 2/2003 | Kelley | 714/38.1 |
| 6,564,261 B1 * | 5/2003 | Gudjonsson et al. | 709/227 |
| 6,721,578 B2 * | 4/2004 | Minear et al. | 455/566 |
| 7,020,685 B1 | 3/2006 | Chen | |
| 7,234,103 B1 * | 6/2007 | Regan | 715/234 |
| 2002/0013747 A1 * | 1/2002 | Valentine et al. | 705/31 |
| 2002/0111888 A1 * | 8/2002 | Stanley et al. | 705/31 |
| 2004/0083145 A1 * | 4/2004 | Kobayashi et al. | 705/31 |
| 2004/0122788 A1 * | 6/2004 | Griffith et al. | 706/61 |
| 2004/0186661 A1 * | 9/2004 | Barton | 701/200 |
| 2006/0085304 A1 * | 4/2006 | Buarque De Macedo et al. | 705/31 |
| 2006/0271451 A1 * | 11/2006 | Varughese | 705/31 |
| 2006/0282354 A1 * | 12/2006 | Varghese | 705/32 |
| 2007/0136157 A1 * | 6/2007 | Neher et al. | 705/31 |
| 2008/0040779 A1 * | 2/2008 | Budzichowski | 726/5 |

* cited by examiner

*Primary Examiner* — Ig T An
(74) *Attorney, Agent, or Firm* — Osha • Liang LLP

(57) ABSTRACT

An electronic filing system may electronically file a tax return created by a user using a tax preparation application. The electronic filing system may receive an error indication from a taxing authority identifying a specific tax return error. The electronic filing system may create an error notification including an error description, error solution, and mechanism for correcting the error. The electronic filing system may send the error notification to a device associated with the user. The device may not be the same device in which the tax preparation application created the tax return. The mechanism may enable the user to correct the error without the tax preparation application. The electronic filing system may receive an error correction sent from the user's device according to the mechanism of the error notification. The electronic filing system may correct an error of the tax return according to the error correction.

13 Claims, 9 Drawing Sheets

NOTIFICATION AND CORRECTION OF E-FILING REJECTIONS

PRIORITY CLAIM

This application claims benefit of priority of U.S. Provisional Patent Application No. 60/870,539, entitled "Notification and Correction of E-Filing Rejections" filed on Dec. 18, 2006, and which is herein incorporated by reference in its entirety.

BACKGROUND

Electronic filing has become a popular method of filing tax returns with taxing authorities. Typically, a user (e.g. a taxpayer) may prepare an electronic tax return with a desktop or web-based tax preparation application on a computer (e.g., a desktop computer). The tax preparation application may present a long list of tax-related questions to the user in order to collect the information necessary to create the tax return. The list of questions may be presented to the user through a series of interview screens that prompt the user for specific tax related information. After the user has provided the necessary tax information, the tax preparation application may create an electronic tax return for the user. Subsequently, the tax preparation application may (automatically or upon user request) submit the tax return to an electronic filing service for electronic filing with a taxing authority. The electronic filing server may perform any necessary formatting changes to the tax return and electronically file the tax return with a taxing authority (e.g., the Internal Revenue Service).

After receiving the electronically filed tax return, the taxing authority may check for numerous errors (e.g., errors of the user-supplied tax information) within the tax return. If an error is detected, the taxing authority may send a notification to the electronic filing server that indicates an error has been detected in the electronically filed tax return. In response, the electronic filing server may send a general error notification to the tax preparation application. The user may be sent an email notification that an error occurred. In order to determine and/or correct the error, it is typically necessary for the user to access the tax preparation application (and a device on which the application is configured to run) that was used to prepare the electronically filed tax return. Thus, it may be necessary for the user to navigate through the series of interview screens, correct errors of the tax information, and resubmit the tax return to the electronic filing service for electronic filing. Additionally, the user may not be able to receive error notifications and/or correct errors while away from the user's computer on which the application is configured to run.

SUMMARY

A user may prepare an electronic return with a preparation application such as a desktop preparation application or web-based preparation application. The preparation application may present to the user a series of questions or interview screens prompting the user for information and/or data. After the user provides the necessary data (e.g., contact information, income information, dependent information), the preparation application may create an electronic return. The user may submit the electronic return to the electronic filing system via the preparation application.

The authority may check for numerous errors within the electronic return. Common errors may include an incorrect entry (e.g., an incorrect social security number), missing entry, mathematical error, incorrect number format, and/or inconsistencies among fields. When the authority detects an error in the return, it may send an error indication to the electronic filing system. In some embodiments, the error indication may include an error code that corresponds to a specific error of the return.

The electronic filing system may receive the error indication from the authority and use the error indication to determine the specific error of the return. Once the electronic filing system has determined the specific error, it may create an error notification to send to a user device of the user that created the return. The error notification may include a mechanism for correcting the error that may enable the user to correct the error of the return without using a preparation application.

The electronic filing system may send the error notification to the user via a user device of the user and receive an error correction from the user. For example, the user device may be a mobile phone and the error notification may be a text message. Additionally, the error correction mechanism may include an embedded reply-to address that directs replies (including error corrections) to the electronic filing system. The user may directly respond to the error notification with an error correction using the standard text message reply functionality of the mobile phone, and the error correction will automatically be sent to the electronic filing system according to the embedded reply-to address. Thus, the error correction mechanism may enable the user to correct the error without having to access the preparation application to correct the error.

While the electronic filing system is described herein by way of example for several embodiments and illustrative drawings, those skilled in the art will recognize that the electronic filing system is not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of the electronic filing system as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

An electronic filing system may receive a tax return from a user (e.g., via a tax preparation application), electronically file the tax return with a taxing authority, and subsequently receive an error indication associated with the tax return from the taxing authority. In response to the error indication, the electronic filing system may send an error notification to the user. The error notification may include a mechanism that enables the user to correct the error of the tax return without having to access the tax preparation application to correct the error. For example, the error notification may be a Short Message Service (SMS) text message sent to a user's mobile phone. The SMS text message may include an embedded reply-to address (e.g., a text messaging address of the electronic filing system) thus enabling the user to submit an error correction to the electronic filing system by directly replying with an error correction in an SMS text message from the user's mobile phone. After receiving the error correction, the electronic filing system may correct the error with the taxing authority. For example, the electronic filing system may incorporate the correction into the tax return, and electronically file the corrected tax return with the taxing authority. Alternatively, the electronic filing system may directly submit the error correction to the taxing authority to correct the error.

Figure 1:
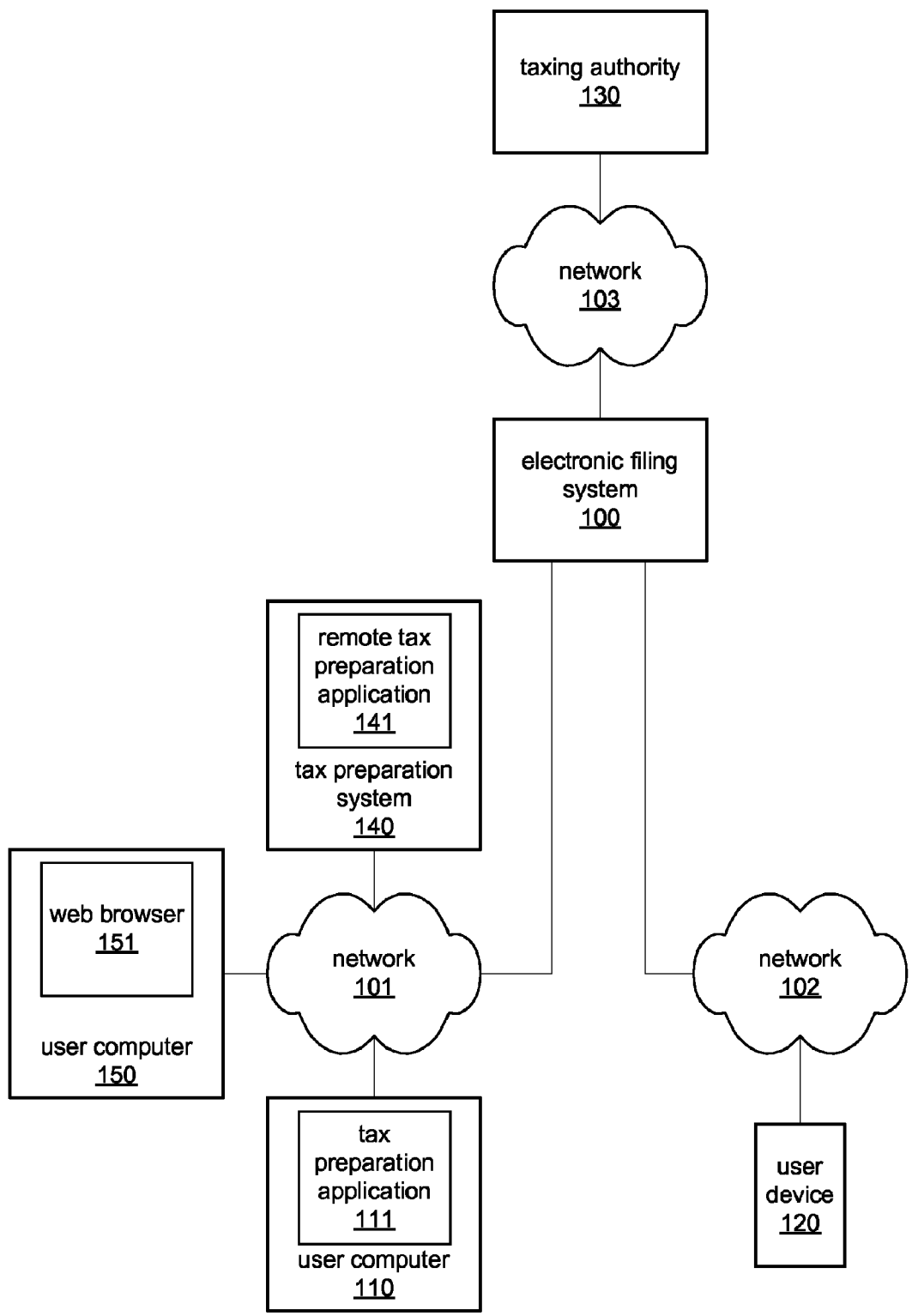
FIG. 1 is a block diagram illustrating an electronic filing system according to one embodiment.

FIG. 1 illustrates a system including electronic filing system 100. Electronic filing system 100 may be configured to receive an electronic tax return from a tax preparation application such as tax preparation application 111. In one embodiment, a user (e.g., a taxpayer) may use a computer such as user computer 110 to run tax preparation application 111. User computer 110 may be any device configured to run a tax preparation application such as a desktop computer running an operating system such as Microsoft Windows™. Tax preparation application 111 may be any application capable of preparing or creating an electronic tax return for a user. For example, in one embodiment, tax preparation application 111 may present a series of questions or interview screens that prompt the user to enter tax related information. Once the user has provided tax preparation application 111 with the necessary tax related information, the tax preparation application may create an electronic tax return.

In another embodiment, the user may utilize a computer that is not equipped with a tax preparation application in order to electronically file their tax return. For example, the platform of the user's computer may not be supported by the tax preparation application, or the user may simply prefer not to install additional applications such as tax preparation applications on their computer. Thus, the user may use a computer, such as user computer 150, equipped with web browser 151 to access a remote tax preparation application, such as remote tax preparation application 141. Web browser 151 may represent any of various web-browsing applications, such as Microsoft Internet Explorer™, Netscape Navigator™, Mozilla Firefox™, or any application that is capable of accessing and displaying documents or web pages, such as according to the Hypertext Transport Protocol (HTTP). Additionally, web browser 151 may utilize additional applications that are necessary to access remote tax preparation application 141 such as a web browser plug-in or Java applet or any other application that adds functionality to web browser 151.

Thus, the user may use web browser 151 to access remote tax preparation application 141 of tax preparation system 140 over network 101. Remote tax preparation application 141 may be any application capable of preparing or creating an electronic tax return by receiving tax related information from a user over a network such as network 101. For example, in one embodiment, web browser 151 may access and display to the user a user interface of remote tax preparation application 141. The user interface may enable the user to submit tax related information to remote tax preparation application 141. In one embodiment, web browser 151 may present to the user a series of questions or interview screens that prompt the user for tax related information. After receiving tax related information from the user, remote tax preparation application 141 may create an electronic tax return. In some embodiments, tax preparation system 140, may be integrated into electronic filing system 100. Thus, the user may access electronic filing system 100 from a user computer, such as user computer 150, to create the electronic tax return with the integrated tax preparation system.

Once the tax return has been created by a tax preparation application (e.g., desktop or remote tax preparation application) as described above, the tax return may be transmitted (automatically or upon user request) to an electronic filing system such as electronic filing system 100 over a network such as network 101.

In some embodiments, such as described above in regard to an electronic filing system with an integrated tax preparation system, the electronic filing system may have direct access (e.g., through a shared memory, shared disk, or shared database) to a tax return created by the integrated tax preparation system. Thus, the electronic filing system may access the electronic tax return directly instead of receiving the tax return over a network such as network 101.

When received by electronic filing system 100, the electronic tax return may need to be formatted before electronically filing the tax return with a taxing authority such as taxing authority 130. For example, the electronic tax return may be of a particular format used by the tax preparation application for creating tax returns. However, taxing authority 130 may not be configured to receive electronic tax returns of the particular format. Thus, electronic filing system 100 may format the electronic tax return so that it may be electronically filed with taxing authority 130. For example, if taxing authority 130 accepts tax returns that are formatted according to a particular extensible markup language (XML) schema or a particular Electronic Data Interchange (EDI) format, electronic filing system 100 may format the electronic tax return according to the particular XML schema or EDI format. In general, electronic filing system 100 may have knowledge of the particular electronic tax return formats accepted for electronic filing by taxing authority 130 and format the electronic tax return accordingly.

After formatting the electronic tax return to the proper format, electronic filing system 100 may electronically file the tax return with taxing authority 130. To electronically file the tax return, electronic filing system 100 may send the electronic tax return to taxing authority 130 over network 103. While networks 101, 102 and 103 are illustrated as separate networks, in some embodiments, networks 101, 102 and 103 (or any combination thereof) may be the same network. For example, network 101 and 103 may be the Internet while network 102 may be a cellular data network. In further example, networks 101, 102 and 103 may be a WAN such as the Internet.

After receiving the tax return, taxing authority 130 may check for numerous errors within the tax return. For example, common errors may include an incorrect entry (e.g., an incorrect social security number), missing entry, mathematical error, or an incorrect number format. Other errors may include inconsistencies among fields. For example, a tax return may indicate that the user has listed three exemptions but claimed a deduction corresponding to four exemptions. Since the deduction should be calculated from the number of exemptions, the taxing authority may detect that there is an inconsistency with either the exemption field or the deduction field. In some embodiments, the taxing authority may verify the correctness of data or information within the tax return to data or information that the taxing authority has on record. For example, the taxing authority may verify that the primary identification number (e.g., a social security number) of the tax return correctly corresponds to the primary name of the tax return (e.g., the user's name) based on internal records including corresponding names and identification numbers. In general, the taxing authority may detect any error of the tax return that may affect the electronic filing of the tax return according to the requirements of the taxing authority.

After checking for errors within the electronically filed tax return, taxing authority 130 may send an acknowledgment to electronic filing system 100 over network 103. The acknowledgment may notify the electronic filing system of any errors detected in the electronically filed tax return. If no errors are detected in the electronically filed tax return, the acknowledgment may include a confirmation number (e.g., a Declaration Control Number) that confirms the taxing authority has accepted the tax return and that no errors are present within the tax return. If an error is detected within the tax return, the acknowledgment may contain an error indication associated with the error. In other words, the acknowledgment may notify the electronic filing system 100 of the specific error detected. For example, the acknowledgment may include an error code that corresponds to a specific error of the tax return. Electronic filing system 100 may be configured to interpret the error code by querying a file or database that maps error codes to specific errors. In one embodiment, the electronic filing system 100 may include an interpreter component configured to interpret the error indication and generate the correct error notification to be sent to the user. For example, the interpreter may be configured to read an error code of the error indication and generate a corresponding error notification. In some cases, the interpreter may receive knowledge of the specific device(s) used by a user and generate the error notification to be compatible with the device. For example, if the user device is a mobile phone, the interpreter may generate the error notification as an SMS, EMS, MMS, WAP Push, Java applet or other message compatible with the mobile phone. In further example, if the user device is a personal computer, the interpreter may generate the error notification as an e-mail message or web page that may be viewed on the personal computer. In one embodiment, the interpreter may be configured to analyze network 102 to determine the type of user device 120 and generate a corresponding error notification. In another embodiment, the interpreter may query user device 120 to determine the type of device and generate a corresponding error notification. In general, the interpreter may generate the error notification such that the error notification is compatible with a user device of the user.

After receiving an acknowledgment that indicates an error is present within the tax return, electronic filing system 100 may notify a user of the error by sending an error notification to user device 120. While FIG. 1 illustrates a single user device 120, electronic filing system 100 may be capable of communicating with multiple user devices over multiple networks. Additionally, electronic filing system 100 may communicate with multiple different user devices over multiple different networks. User device 120 and the error notification are described in more detail below.

User device 120 may be any device capable of receiving error notifications (described in further detail below) from electronic filing system 100. For example, user device 120 may be a mobile device such as a mobile phone, two-way paging device, or personal digital assistant (PDA). Additionally, the user device may be an integration of mobile devices such as a smartphone or PDA phone (e.g., a device that combines the functionality of a mobile phone with a PDA). In one embodiment, user device 120 may be a computer such as a notebook computer coupled to a wireless or cellular network. User device 120 may be configured to receive and send electronic messages (e.g., error notifications and error corrections). In one embodiment, user device 120 may be configured to send and receive text messages. For example, in one embodiment, user device 120 may be configured to receive and send messages according to various text messaging standards including Short Message Service (SMS), Enhanced Message Service (EMS), and/or Multimedia Message Service (MMS). In other embodiments, user device 120 may be configured to send and receive messages according to a wireless communication protocol such as the Wireless Application Protocol (WAP). Additionally, user device 120 may be configured to receive and respond to push messages such as WAP Push messages. In some embodiments, user device 120 may be configured to send and receive electronic mail (email) messages. Furthermore, user device 120 may include components to facilitate the sending and receiving of messages as described above. For example, in one embodiment, user device 120 may include an SMS, EMS, MMS, and/or WAP Push message client that is capable of storing and retrieving messages from an inbox for later use. In another embodiment, user device 120 may include an electronic mail client to send and receive messages (e.g., Microsoft Outlook or an email client for mobile devices such as Microsoft Outlook Mobile). Generally, user device 120 may be any of the various devices described above or any device configured to receive the error notifications described below. Furthermore, user device 120 may be, but is not necessarily, a different device than the one the user used to prepare the electronic tax return.

The error notification may indicate to the user an error description and error solution in addition to an error correction mechanism that enables the user to correct the specific error. The error description may be a description of the particular error to be corrected. For example, if the error of the tax return were an incorrect user identification number (e.g., an incorrect social security number), the error description may indicate to the user that the identification number of the tax return does not match the taxing authority's records. Thus, the error solution may indicate to the user a method of correcting the error. If the error were an incorrect user identification number as described above, the error solution may instruct the user to correct the error by submitting the correct identification number. Additionally, the error solution may instruct the user to utilize the error correction mechanism of the error notification as described below.

The error correction mechanism may enable the user to correct the error without using a tax preparation application such as the tax preparation that was used to create the tax return. In other words, without the error correction mechanism, the user may need to use a tax preparation application to correct any errors of the tax return. In one embodiment, the error notification may be a text message (e.g., an SMS, EMS, MMS, or WAP Push message) that includes an embedded reply-to address (the error correction mechanism) such that the user may respond to the error notification with an error correction. For example, if the error of the tax return were an incorrect identification number (e.g., a social security number) of a dependent (e.g., the user's child), the error notification may be a text message received on the user's mobile phone. An embedded reply-to address of the text message may enable the user to reply (using the standard reply functionality of the mobile phone) to the message with the correct identification number. The reply (including the error correction) may be sent to the reply-to address of the error notification. Thus, the reply-to address may direct the reply to be sent to electronic filing system 100 over network 102.

In one embodiment, the error notification may be a text message (e.g., an SMS, EMS, MMS, or WAP Push message) that includes a Uniform Resource Identifier (URI) (e.g., a hyperlink to a webpage). The text message may be sent to the user's device such as user device 120 by the electronic filing system. The URI, when selected, may direct the user to an interface (e.g., a webpage) for submitting an error correction. The interface may include a field in which the user may enter an error correction. For example, if the error of the tax return were an incorrect bank routing number (e.g., of a bank account in which a tax refund is to be sent), the user may enter the correct bank routing number and select a submit option of the interface in order to send the correction to electronic filing system 100 over network 102. In other embodiments, the URI may direct the user to a correction application (e.g., a Java application or applet) that the user may download. The correction application may provide an interface for the user to enter an error correction and submit the correction to an electronic filing system such as electronic filing system 100. For example, when the user selects the URI of the text message, the user device may automatically download a Java applet that may be run on the user's device. The Java applet may prompt the user for the correction (e.g., a correct bank routing number) and submit the correction to electronic filing system 100 over network 102.

In another embodiment, the error notification may be a push message (e.g., WAP Push) sent to the user device by an electronic filing system such as electronic filing system 100. Once the push message is received on the user device, a message prompt may appear on the display of the user device. The message prompt may inform the user of the tax return error and ask the user if they would like to correct the error at that time. If the user chooses to correct the error, the user may automatically be directed to a web-based user interface in which the user may enter an error correction that is transmitted to electronic filing system 100. In other embodiments, if the user chooses to correct the error, the push message may launch a correction application on the user device in which the user may enter an error correction. The correction application may send the error correction to electronic filing system 100. In general, the correction application may be any application, other than the tax preparation application, configured to receive an error correction and subsequently submit the error correction to an appropriate taxing authority.

The error correction may be sent from user device 120 to electronic filing system 100 over a network, such as network 102. In some embodiments, network 102 may be a wireless network such as a cellular network or cellular data network. For example, network 102 may include Global System for Mobile Communications (GSM) networks, code division multiple access (CDMA) networks, and time division multiple access (TDMA) networks. In other embodiments network 102 may be a WAN such as the Internet or a wireless WAN. In yet another embodiment, network 102 may be a combination of the networks described above such as a combination of cellular networks and the Internet.

After receiving the error correction from the user device, electronic filing system 100 may incorporate the error correction into the user's tax return to create a corrected tax return. Subsequently, the electronic filing system may electronically file the corrected tax return with the taxing authority. Alternatively, the electronic filing system may directly submit the error correction to the taxing authority to correct the error.

Figure 2:
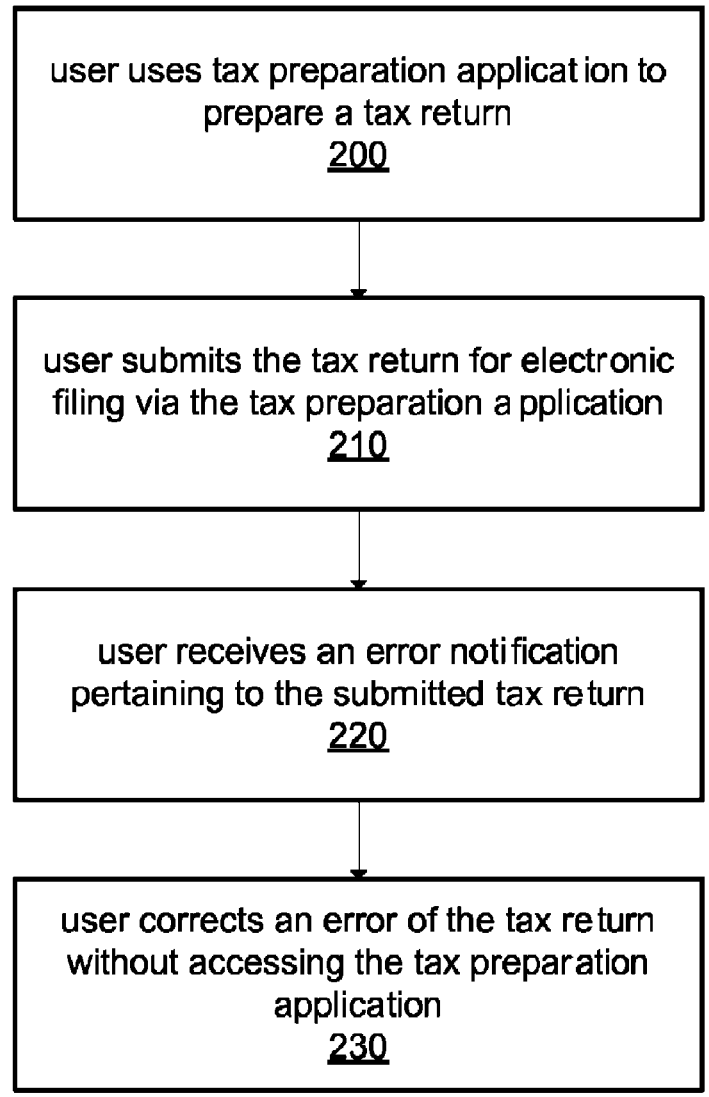
FIG. 2 is a flowchart illustrating a method for a user to correct an error in an electronically filed tax return according to one embodiment.

FIG. 2 illustrates one embodiment of a method for a user to correct an error in an electronically filed tax return as described herein. As illustrated by block 200, the user may use a tax preparation application to prepare a tax return for electronic filing. For example, the user may use a desktop tax preparation application or a web-based application to prepare a tax return. The tax preparation application may prompt the user with a series of questions or interview screens associated with information necessary for the completion of a tax return. Once the user has completed the series of questions or interview screens, the tax preparation application may create an electronic version of the tax return that may be transmitted to an electronic filing system such as electronic filing system 100 of FIG. 1. In some embodiments, the user may use a tax preparation application such as a desktop application configured to transmit an electronic version of the tax return to an electronic filing system such as electronic filing system 100 of FIG. 1. In other embodiments, the user may access a web-based application (or other network based application) to prepare the tax return for submission to an electronic filing system such as electronic filing system 100. For example, the user may use a web browser on a computer (e.g., user computer 110) to access a tax preparation application located at another location such as tax preparation application 141 on tax preparation system 140. Furthermore, the web browser may be configured to install and run additional programs that may be necessary for the user to use the web-based tax preparation application. For instance, the web browser may be configured to install (automatically or upon user request) a plug-in that adds additional functionality to the web browser such as the ability to implement a tax preparation application. For example, the web browser may be configured to run a plug-in associated with the tax preparation application such as a Java plug-in configured to receive tax return error corrections from a user and submit the corrections to an electronic filing service.

Once the tax return has been completed, the user may submit an electronic version of the tax return for electronic filing via the tax preparation application as illustrated by block 210. The electronic version of the tax return may be submitted to an electronic filing system such as electronic filing system 100. In one embodiment, the user may be using a desktop tax preparation application configured to submit (automatically or upon user request) an electronic version of the tax return to an electronic filing system through a WAN (e.g., network 101) such as the Internet. In another embodiment, the user may be using a web-based application (or other network based application) configured to submit (automatically or upon user request) an electronic version of the tax return to an electronic filing system through a WAN (e.g., network 101) such as the Internet.

After the tax return has been submitted, the user may receive an error notification(s) pertaining to the submitted tax return as illustrated by block 220. The notification may be sent by an electronic filing system such as electronic filing system 100. The user may receive the error notification over a network (e.g., network 102). In one embodiment, the user may receive the error notifications over a wireless network such as a cellular network or a WLAN. In other embodiments, the user may receive the error notification over a WAN such as the Internet. In yet another embodiment, the user may receive the error notification though a combination of different networks. For example, an electronic filing server, such as electronic filing server 100, may send a text message (e.g., an SMS text message) error notification to a web-based text message server. In response, the web-based text message server may forward (with or without modification) the text message to a user device (e.g., mobile phone) via a wireless network such as a cellular network. The user may then receive the error notification by accessing the user device.

The user may receive the error notification(s) via a device capable of receiving an error notification from an electronic filing server. For example, if the electronic filing server sends an error notification via a text message (e.g. an SMS text message), the user may receive the error notification on a device capable of receiving text messages such as a mobile phone or two-way paging device. Additionally, the user may receive the error notification on a device (e.g., desktop or laptop computer) capable of receiving messages (e.g., e-mail) over a WAN (e.g., the internet). The user may also receive an error notification via any of the devices described above in regard to user device 120 of FIG. 1.

After receiving the error notification pertaining to the submitted tax return, the user may correct the error indicated by the notification without accessing the tax preparation application as illustrated by block 230. The error notification may include an error description and an error solution. In other words, the notification may inform the user of a specific error detected in the submitted tax return and inform the user of a method for solving the problem. However, in addition to the error description and error solution, the notification may provide a mechanism that enables the user to correct an error of the tax return without accessing the tax preparation application. For example, the notification may be a text message with an embedded reply-to address for the submission of an error correction from the user. In other words, the text message may include a description of the error (e.g., an incorrect social security number), a description of the solution (e.g., instructions to reply to the message with a correct social security number), and a mechanism to correct the error (e.g., an embedded reply-to address that enables the user to simply reply to the text message with the correct social security number). Additional embodiments of various error notifications will be discussed in more detail in the descriptions of FIG. 3-FIG. 8. Furthermore, the user may correct the error according to the error notifications described herein and without a tax preparation application. Thus, instead of receiving a general error message and returning to the tax preparation software to determine and correct the error(s), the user may simply correct the error according to the error notification (e.g., replying to a text message).

Figure 3:
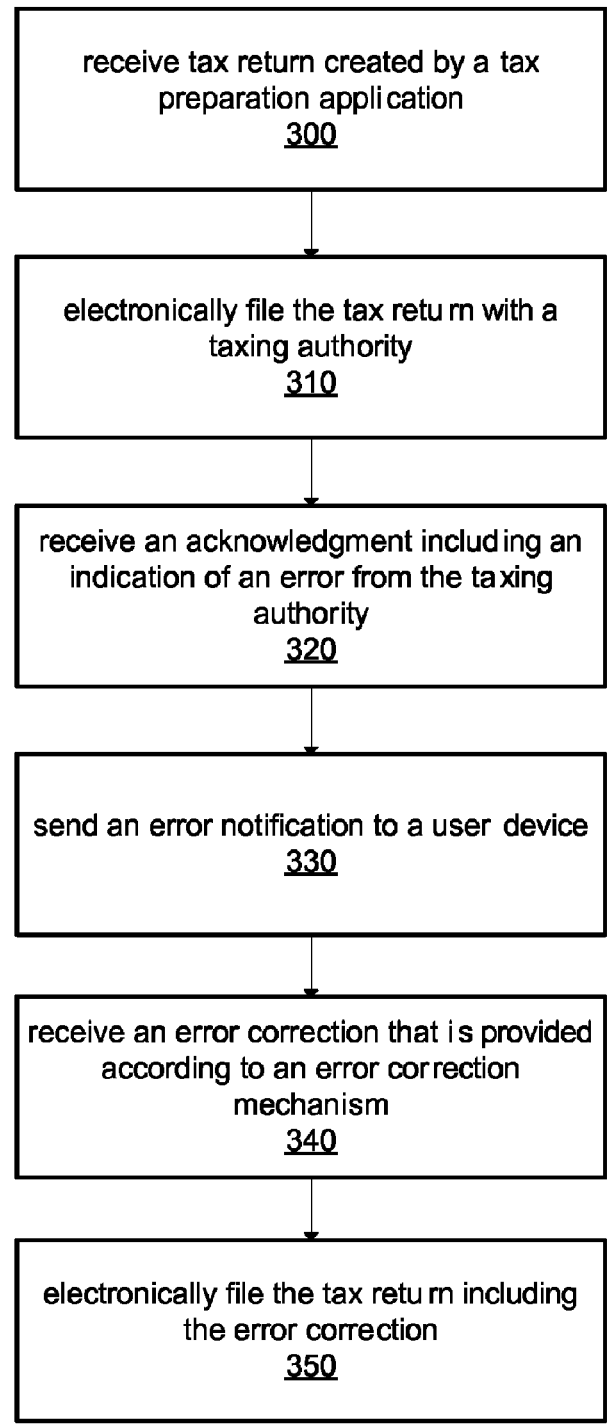
FIG. 3 is a flowchart illustrating a method for interacting with a taxing authority and a user to correct tax return errors according to one embodiment.

FIG. 3 illustrates one embodiment of a method for interacting with a user and a taxing authority to correct tax return errors as described herein. The method may be performed by electronic filing system 100. Block 300 illustrates receiving a tax return created by a tax preparation application. For example, the electronic filing system may receive a tax return submitted by a user via a tax preparation application such as tax preparation application 111 or remote tax preparation application 141 as described above. For example, the user may create an electronic tax return with a tax preparation application and submit the tax return to electronic filing system 100 over a WAN such as the Internet. In another embodiment, the tax preparation application may create an electronic tax return and store the tax return on the user's computer. The user may then submit the tax return to an electronic filing system by uploading the tax return to a server of the electronic filing system. Thus, receiving a tax return created by a tax preparation application may include receiving a tax return uploaded directly by the user such as through File Transfer Protocol (FTP), HTTP, or any other method in which a user may upload an electronic file to a server.

As illustrated by block 310, once the tax return is received, it may be electronically filed with a taxing authority such as taxing authority 130. However, when received, the electronic tax return may be of a format that is not accepted for electronic filing by the appropriate taxing authority. Thus, electronically filing the tax return with a taxing authority may include formatting the tax return to be electronically filed such as described above in regard to electronic filing system 100 of FIG. 1. Once the tax return is formatted correctly, electronically filing the tax return may include transmitting the tax return to a taxing authority such as taxing authority 130 over a network such as network 103.

After the tax return is electronically filed, the taxing authority may check for numerous errors within the tax return. As described above in regard to FIG. 1, common errors may include an incorrect entry (e.g., an incorrect social security number), missing entry, mathematical error, or an incorrect number format. Other errors may include inconsistencies among fields. For example, a tax return may indicate that a user's filing status is "single" in addition to presenting an identification number (e.g., social security number) for a joint filer. Thus, the electronic filing system may detect that there is an inconsistency with either the filing status or the indication of a joint filer's identification number. In some embodiments, the taxing authority may verify the correctness of data or information within the tax return to data or information that the taxing authority has on record. For example, the taxing authority may verify that the primary identification number (e.g., a social security number) of the tax return correctly corresponds to the primary name of the tax return (e.g., the user's name) based on internal records including corresponding names and identification numbers. In general, the taxing authority may detect any error of the tax return that may affect the electronic filing of the tax return.

After determining the tax return errors within the electronically filed tax return, the taxing authority may send an acknowledgment to electronic filing system 100 over network 103. The acknowledgment may notify the electronic filing system of any errors detected in the electronically filed tax return. If no errors are detected in the electronically filed tax return, the acknowledgment may include a confirmation number (e.g., a Declaration Control Number) that confirms the taxing authority has accepted the tax return and that no errors are present within the tax return. If an error is detected within the tax return, the acknowledgment may contain an error indication associated with the error. In other words, the acknowledgment may indicate the specific error detected. Thus, as illustrated by block 320, receiving an indication of an error from the taxing authority may include receiving the acknowledgment from the taxing authority such as taxing authority 130. In some embodiments, the acknowledgment may include an error code that corresponds to a specific error of the tax return (e.g., an error of a specific field or line in a tax return form). Thus, receiving an indication of an error may include interpreting the error code by querying a database that maps error codes to specific errors. For example, after querying the database with an error code, the database may return an error description and an error solution. Such a database may also return an indication of an error correction mechanism (described below in the description of the error notification) that may be used to correct the error.

In one embodiment, the error indication may be interpreted in order to generate the correct error notification to be sent to the user. For example, interpreting the error indication may include reading an error code of the error indication and generating a corresponding error notification. Generating the corresponding error notification may include determining the specific type of user device the user is using in order to generate a compatible error notification. For example, if the user device is a mobile phone, the error notification may be generated to be an SMS, EMS, MMS, WAP Push, Java applet or other message compatible with the mobile phone. In further example, if the user device is a personal computer, the error notification may be generated as an e-mail message or web page that may be viewed on the personal computer. In general, the error notification may be generated such that it is compatible with a user device of the user.

Once the specific error has been determined from the tax authority's indication, an error notification may be sent to a user via a user device as illustrated by block 330. The error notification may indicate to the user the specific error of the tax return and instruct the user to correct the error. The error notification may indicate to the user an error description and error solution in addition to an error correction mechanism that enables the user to correct the specific error. The error description may be a description of the particular error to be corrected. For example, if the error of the tax return were an incorrect user identification number (e.g., an incorrect social security number), the error description may indicate to the user that the identification number of the tax return does not match the taxing authority's records. Thus, the error solution may indicate to the user a method of correcting the error. In the case of an incorrect identification number, the error solution may instruct the user to correct the error by submitting the correct identification number via the user device. Additionally, the error solution may instruct the user to utilize the error correction mechanism as described below.

The error correction mechanism of the notification may enable the user to correct the error without using a tax preparation application such as the tax preparation that was used to create the tax return. In other words, without the error correction mechanism, the user may need to use a tax preparation application to correct any errors of the tax return. In one embodiment, the error notification is a text message (e.g., an SMS, EMS, MMS, or WAP Push message) that includes an embedded reply-to address (the error correction mechanism) such that the user may respond to the error notification with an error correction. For example, if the error of the tax return were an incorrect identification number (e.g., a social security number) of a dependent (e.g., the user's child), the error notification may be a text message including an error description and solution received on the user's mobile phone. A correction mechanism such as an embedded reply-to address of the text message may enable the user to reply (using the standard reply functionality of the mobile phone) to the message with the correct identification number. Thus, the reply (including the error correction) is sent to the reply-to address of the error notification. The reply-to address may direct the reply to be sent to an appropriate electronic filing system such as electronic filing system 100.

In one embodiment, the error notification may be a text message (e.g., an SMS, EMS, MMS, or WAP Push message) that includes a Uniform Resource Identifier (URI) (e.g., a hyperlink to a web page). The text message may be sent to the user's device such as user device 120 by the electronic filing system. The URI, when selected, may direct the user to an interface (e.g., a web page) for submitting an error correction. The interface may include a field in which the user may enter an error correction. For example, if the error of the tax return were an incorrect bank routing number (e.g., of a bank account in which a tax refund is to be sent), the user may enter the correct bank routing number and select a submit option of the interface in order to send the correction to electronic filing system 100 over network 102. In other embodiments, the URI may direct the user to a correction application (e.g., a Java application or applet) that the user may download onto their device. The correction application may provide an interface for the user to enter an error correction and submit the correction to an electronic filing system such as electronic filing system 100. For example, when the user selects the URI of the text message, the user device may download a Java applet that may be run on the user's device. The Java applet may prompt the user for the correction (e.g., a correct identification number) and submit the correction to the electronic filing system.

In another embodiment, the error notification may be a push message (e.g., WAP Push) sent to the user device by an electronic filing system such as electronic filing system 100. Once the push message is received on the user device, a message prompt may appear on the display of the user device. The message prompt may inform the user of the tax return error and ask the user if they would like to correct the error at that time. If the user chooses to correct the error, the user may automatically be directed to a web-based user interface in which the user may enter an error correction that is transmitted to electronic filing server 120. In other embodiments, if the user chooses to correct the error, the push message may launch a correction application of the user device in which the user may enter an error correction. The correction application may send the error correction to electronic filing system 100. If the user chooses not to correct the error at that time, the message may be stored in a push message inbox of the user device for later access.

In some embodiments, the acknowledgment may indicate that multiple errors are present within the tax return. An indication of multiple errors may result in the sending of multiple error notifications to the user. Alternatively, an indication of multiple errors may result in a single error notification with multiple error descriptions, solutions, and/or correction mechanisms. However, in some cases, it may not be feasible to correct a large number of error notifications from some types of user devices (e.g., a mobile phone with limited text entry functionality). In some cases, an error threshold may be set (e.g., by the user or a system manager) such that when the number of errors (as indicated by the acknowledgment) reaches or exceeds the threshold, the user receives a "multiple error" message in lieu of an error message(s) that directs the user to utilize a correction mechanism to correct the error. The multiple error message may direct the user to correct the multiple errors through an alternate means such as a tax preparation application (e.g., the tax preparation application that originally created the tax return).

In some embodiments, some errors may not be suitable for correction via an error correction mechanism. When an acknowledgement contains an error indication that corresponds to an error that is not suitable for correction via an error correction mechanism, an error notification that directs the user to correct the error through an alternate means such as a tax preparation application (e.g., the tax preparation application that originally created the tax return) may be sent to the user.

After a user responds to the error notification via the correction mechanism, the response (and error correction) may be directly received from the user's device over a network, such as network 102, as illustrated by block 340. For example, receiving the response from the user's device may include receiving an error correction transmitted according to the error correction mechanism. As described above, the error correction mechanism enables a response to be submitted without a tax preparation application. Thus, instead of receiving an error correction from a tax preparation application, the error correction may be received directly from the user's device. Receiving the response may further include incorporating the error correction of the response into the electronic tax return such that a corrected version of the tax return is created. As illustrated by block 350, once the corrected version of the tax return is created, it may be electronically filed with a taxing authority such as taxing authority 130.

Figure 4:
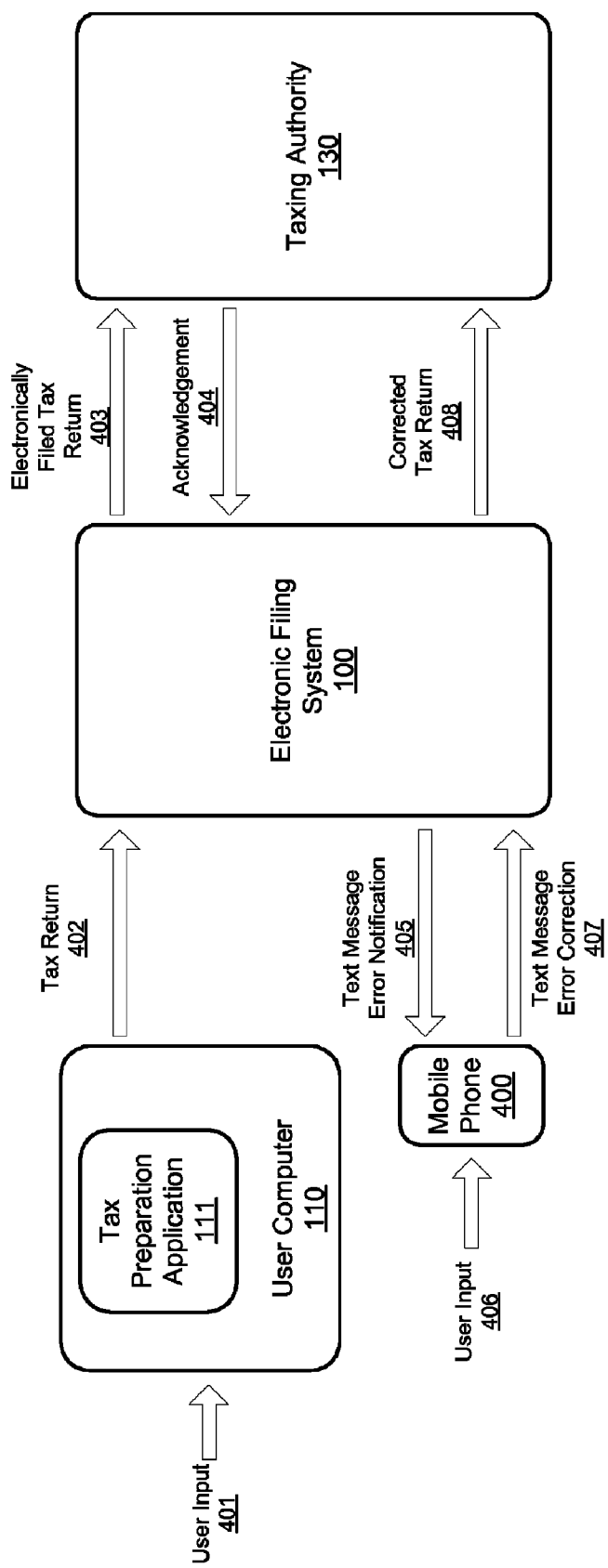
FIG. 4 illustrates a flow diagram of processing a tax return and associated errors and corrections according to one embodiment.

FIG. 4 illustrates a flow diagram of one embodiment of processing a text message error notification. FIG. 4 is presented as one example of processing a text message error notification and is not intended to be representative of all of the various embodiments in which such a system and method may be implemented. As illustrated by user input 401, a user may provide input to user computer 110 and tax preparation application 111. The user input may include various items associated with a tax return such as contact information, income information, deduction information and/or any other information necessary for the filing of a tax return. For this specific example, user input 401 may include an incorrect social security number. Thus, when the tax preparation application creates an electronic tax return from the user input, the tax return may include the incorrect social security number. After creating the tax return, the tax preparation application may (automatically or upon user request) submit the tax return to electronic filing system 100 as illustrated by the transmitting of tax return 402.

Subsequently, electronic filing system 100 may format the electronic tax return in accordance with a format specified by taxing authority 130. For example, the electronic tax return may be of a particular format used by tax preparation application 111 for creating tax returns. However, taxing authority 130 may not be configured to receive electronic tax returns of this format. Thus, electronic filing system 100 may format the electronic tax return so that it may be electronically filed with taxing authority 130. Various examples of tax return formats accepted by a taxing authority are described above in the description of taxing authority 130 of FIG. 1. In general, electronic filing system 100 may have knowledge of the particular electronic tax return formats accepted for electronic filing by taxing authority 130 and format the electronic tax return accordingly. Once the tax return is in the correct format to be submitted, electronic filing system 100 may electronically file the tax return as illustrated by electronically filed tax return 403.

Taxing authority 130 may detect errors within the electronically filed tax return. For example, common errors may include an incorrect entry (e.g., an incorrect social security number), missing entry, mathematical error, or an incorrect number format. Other errors may occur such as described above in regard to the description of taxing authority 130 of FIG. 1. In general, the taxing authority may detect any error of the tax return that may affect the electronic filing of the tax return. In this example, the user has provided an incorrect social security number. Thus, taxing authority 130 may detect the incorrect social security number and create a corresponding acknowledgment to be sent to electronic filing system 100. In this example, the acknowledgement may contain an error code that corresponds to an incorrect social security number error. Once created, the acknowledgment may be sent to the electronic filing system as illustrated by acknowledgment 404.

Electronic filing system may receive acknowledgement 404 and use the error code to determine which error has been detected within the electronically filed tax return. The electronic filing system may utilize the error code as part of a query to an internal error database such that the database may indicate to the electronic filing system the specific error that corresponds to the error code. In this example, after querying the error database with the error code, the database may return an indication that taxing authority 130 has detected an incorrect social security number within the electronically filed tax return. In response, electronic filing system 100 may create an SMS text message error notification as illustrated by text message 500 of FIG. 5 as described below.

Figure 5:
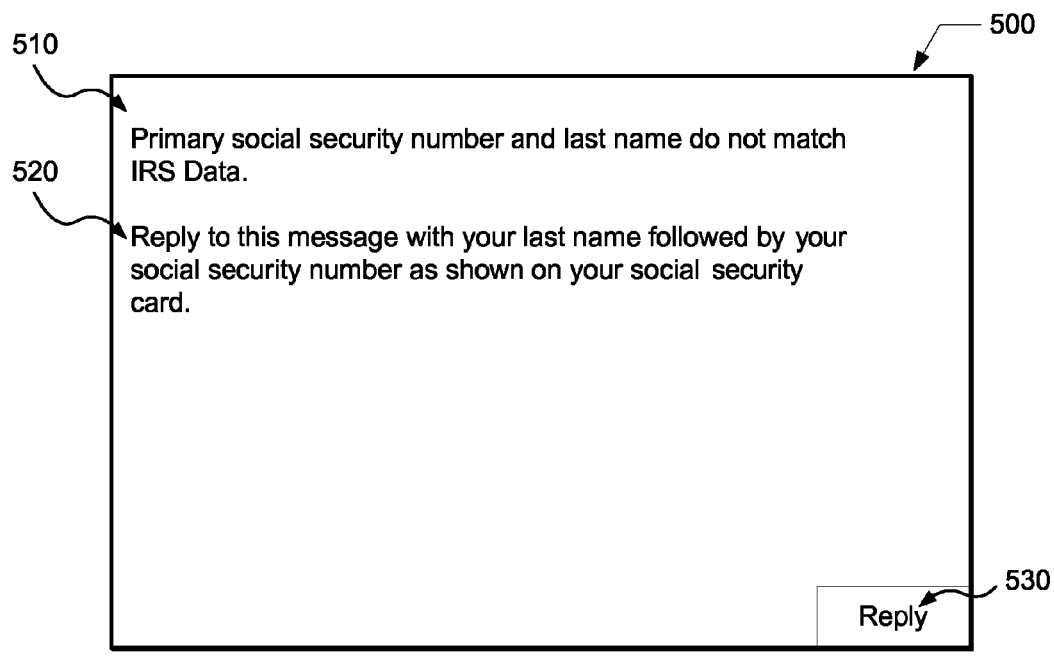
FIG. 5 illustrates a text message error notification according to one embodiment.

FIG. 5 illustrates one embodiment of a text message error notification such as that created by the electronic filing system of FIG. 4. Text message 500 may include error description 510 that indicates the social security number of the tax return does not match the IRS's records. Error solution 520 may instruct the user to correct the error by submitting (via the reply function of the mobile phone) the correct last name and social security number as presented on the users social security card. A reply function 530 may represent an option of the user device (e.g., mobile phone 400) that the user may select in order to reply to the text message. While it may not be visible to the user, the reply-to address may be included within text message 500. In other words, the user may or may not be able to directly see the reply-to address in which the reply is to be sent. Nevertheless, a reply-to address may be embedded within text message 500 such that when the user replies (e.g., with an error correction) to the text message, the reply may be sent to an appropriate electronic filing system such as electronic filing system 100. In other words, in this example, the reply-to address may be an error correction mechanism as described in FIGS. 1-3. In some embodiments, such as the example of FIG. 4., text message 500 may be an SMS text message. In other embodiments, the text message may be a text message of a different text messaging standard or specification such as an EMS, MMS, or WAP Push message. In general, text message 500 may be sent and/or created according to any format, specification or standard accepted by the user device to which the text message is being sent.

Returning to FIG. 4, electronic filing system 100 may send the text message error notification 405 to mobile phone 400. The user may view the text message on a display of the mobile phone. Thus, the user may read the SMS text message (e.g., text message 500) and subsequently provide user input 406 to mobile phone 400. In this example, the user provides a correct last name and social security number through a text and number entry interface of the mobile phone. For example, the user may enter user input 406 through the phone's keypad or a QWERTY keyboard if the phone is equipped with one (e.g., a smartphone). After entering the error correction (the correct last name and social security number), the user may utilize the standard reply function of mobile phone 400 (e.g., selecting the reply function 530 of FIG. 5) in order to send the error correction to electronic filing system 100. Text message error correction 407 illustrates mobile phone 400 sending the error correction to electronic filing system 100.

Once electronic filing system receives the text message error correction, it may incorporate the error correction into the tax return previously submitted thereby creating a corrected tax return. In other words, electronic filing system 100 may update the social security number and last name of the tax return to the correct social security number and last name.

After creation, the corrected tax return 408 may be electronically filed with taxing authority 130.

Figure 6:
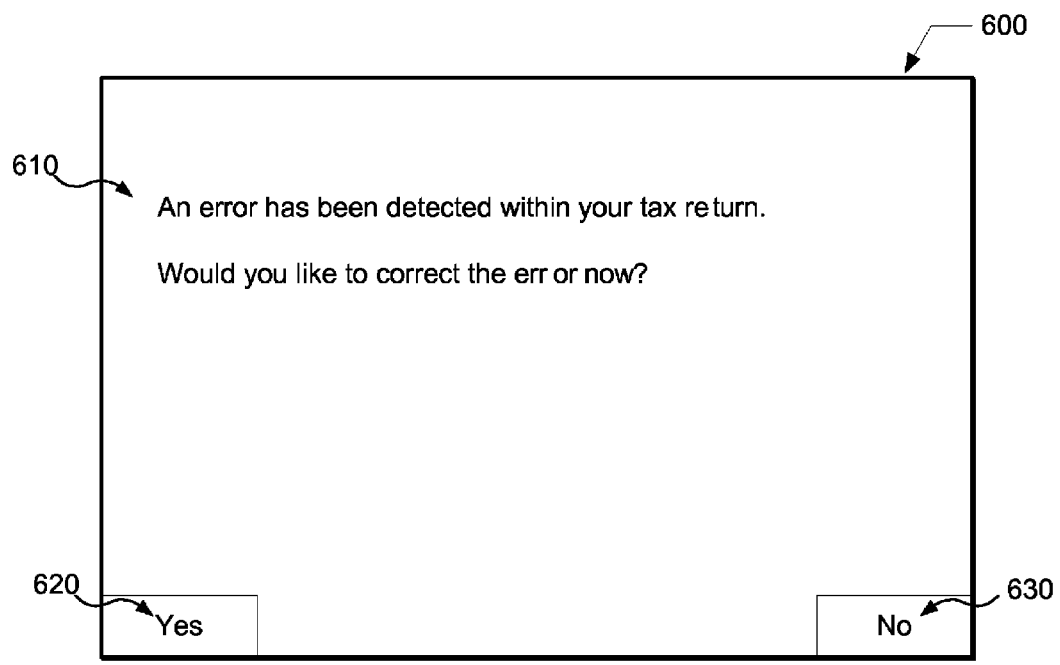
FIG. 6 illustrates a push error notification according to one embodiment.

In addition to text messages as described above in the description of FIG. 5, FIGS. 6-8 illustrate additional embodiments of the error notification that may be sent from the electronic filing server to a user device. FIG. 6 illustrates one embodiment of a push error notification (e.g., a WAP Push message), as described herein. Push error notification 600 may be any error notification received on a user device (e.g., user device 120) that automatically prompts the user to correct an error of the tax return. Push error notification may include a prompt such as prompt 610 that notifies the user of an error and inquires into whether the user would like to correct the error. If the user selects no, such as by selecting option 630, the push notification may be saved in a push message inbox of the user device for later access. If the user selects yes, such as by selecting option 620, various operations may occur according to how the message was configured by the electronic filing server. For instance, in one embodiment, when the user chooses to correct the error by selecting option 620, the push message may be configured to load an application of the mobile device to correct the error. For example, the push message may load a web browser of the user device to access a web-based interface for the submission of error corrections (e.g., such as the interface of FIG. 8 described below). In another embodiment, when the user chooses to correct the error by selecting option 620, the push message may load a correction application (e.g., a Java applet) of the user device that is configured to accept an error correction from the user and transmit the error correction to an appropriate electronic filing system (e.g., in a format different than a text message). If the user device is not equipped with the appropriate correction application, the push message may automatically download the correction application to the user device. In general, the correction application may be any application configured to receive tax return error corrections and submit them to an appropriate taxing authority.

Figure 7:
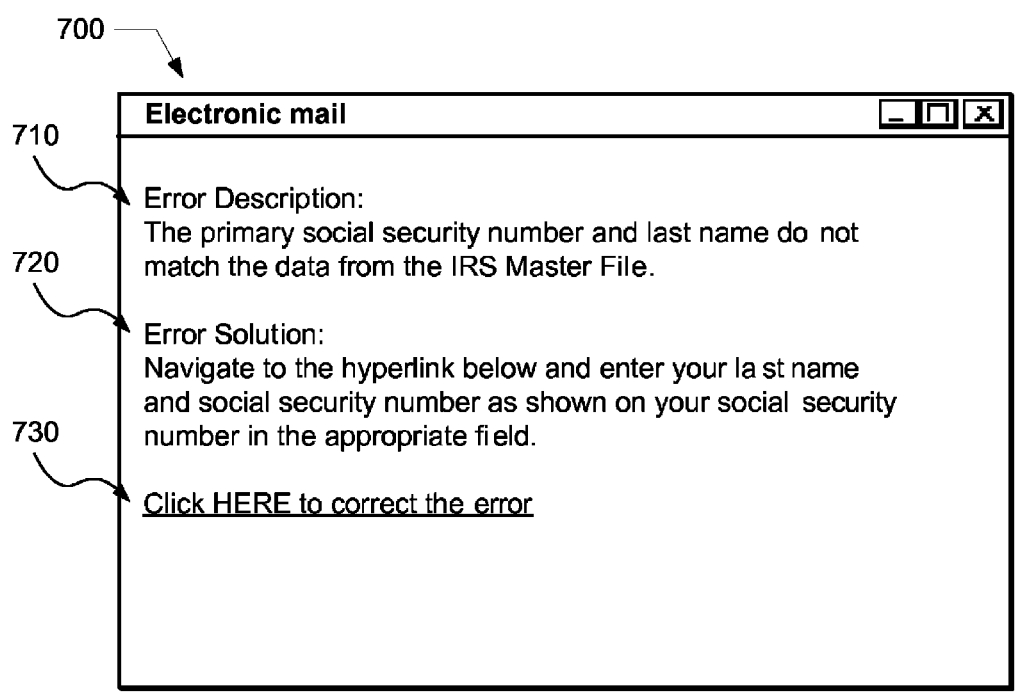
FIG. 7 illustrates an electronic mail error notification according to one embodiment.

FIG. 7 illustrates one embodiment of an electronic mail message representing an error notification sent from the electronic filing system to the user device. In one embodiment, the user device may include an email client (e.g., Microsoft Outlook or Microsoft Outlook Mobile) capable of sending and receiving electronic mail messages. The email client may receive from the electronic filing center an electronic mail message such as electronic mail 700. Electronic mail 700 may include an error description such as error description 710 that describes the specific error detected by the taxing authority. Additionally, electronic mail 700 may include an error solution such as error solution 720 that describes how to correct the error of the tax return. For example, error solution 720 instructs the user to navigate to hyperlink 730 in order to correct the error. Thus, hyperlink 130 may be an error correction mechanism such that when the user selects the hyperlink, they may be presented with a user interface in which to submit an error correction (e.g., a corrected name and social security number). In one embodiment, hyperlink 730 may direct the user to a web-based user interface (e.g., such as the interface of FIG. 8 described below) in which the user may enter tax return error corrections and submit them to a taxing authority. In one embodiment, the user may respond to an electronic mail such as electronic mail 700 with the corrected tax return information by utilizing the standard reply feature of the electronic mail client. For example, a user may reply to message 700 by selecting the standard reply function of the electronic mail client and entering the correct social security number and name. After entering the correct information, the user may send the message to an embedded reply-to address of the error notification using the standard reply functionality of the electronic mail client.

Figure 8:
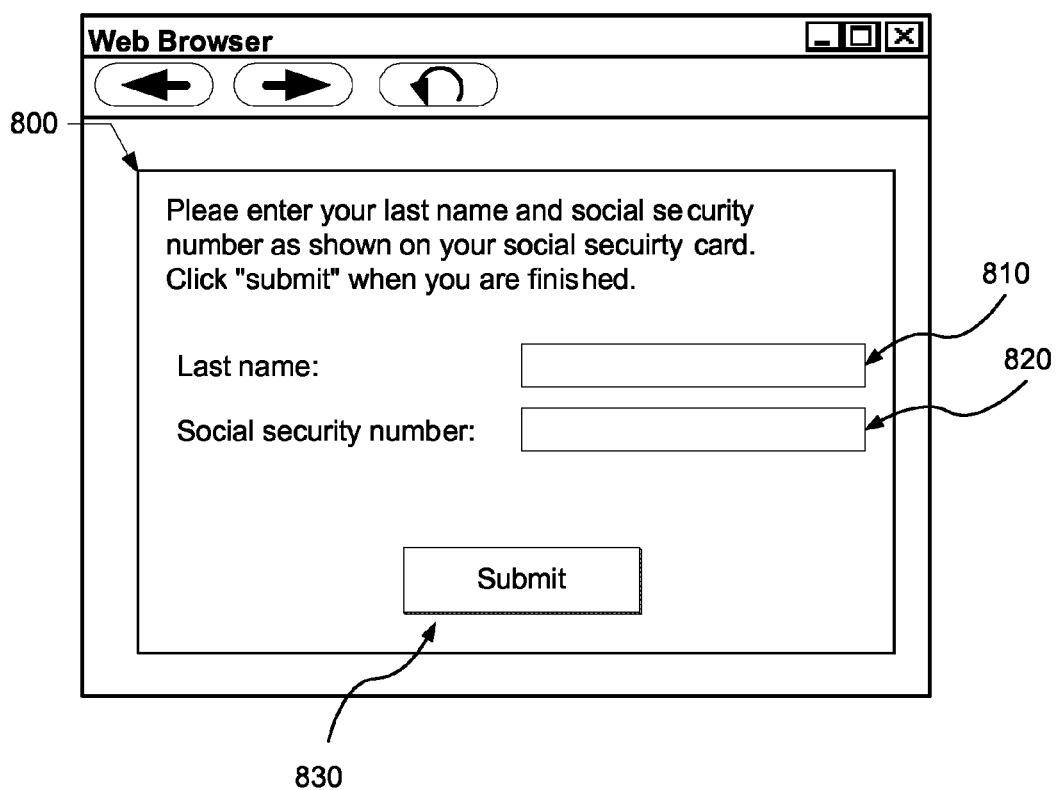
FIG. 8 illustrates a user interface for error corrections according to one embodiment.

FIG. 8 illustrates one embodiment of a web-based user interface for submitting error corrections to an electronic filing service. As described above, a web-based interface such as web-based interface 800 may be navigated to from an error notification sent to a user device. For example, an error notification may include a hyperlink to the web-based interface. Alternatively, a push error notification may automatically direct the user to the web-based user interface when the user chooses to correct the error indicated by the push error notification as illustrated in FIG. 6. The web-based interface for submitting error corrections to an electronic filing service may include user-fillable fields such as fields 810 and 820 in which a user may enter error corrections. Once the error corrections have been entered, the user may choose to submit the error corrections to an appropriate electronic filing service as illustrated by the submit option 830.

Although the above description has been given in terms of electronically filing a tax return with a taxing authority, the system and methods described herein may also apply to electronic filing required by other agencies (e.g., services, authorities or other agencies, governmental or otherwise), such as for electronically filing statements including, e.g., payroll data, financial statements or a Securities and Exchange Commission (SEC) compliance statement. Additionally, while the above methods described herein have been given largely in terms of an electronic filing system, the description is not intended to limit the performing of the methods to an electronic filing system.

Figure 9:
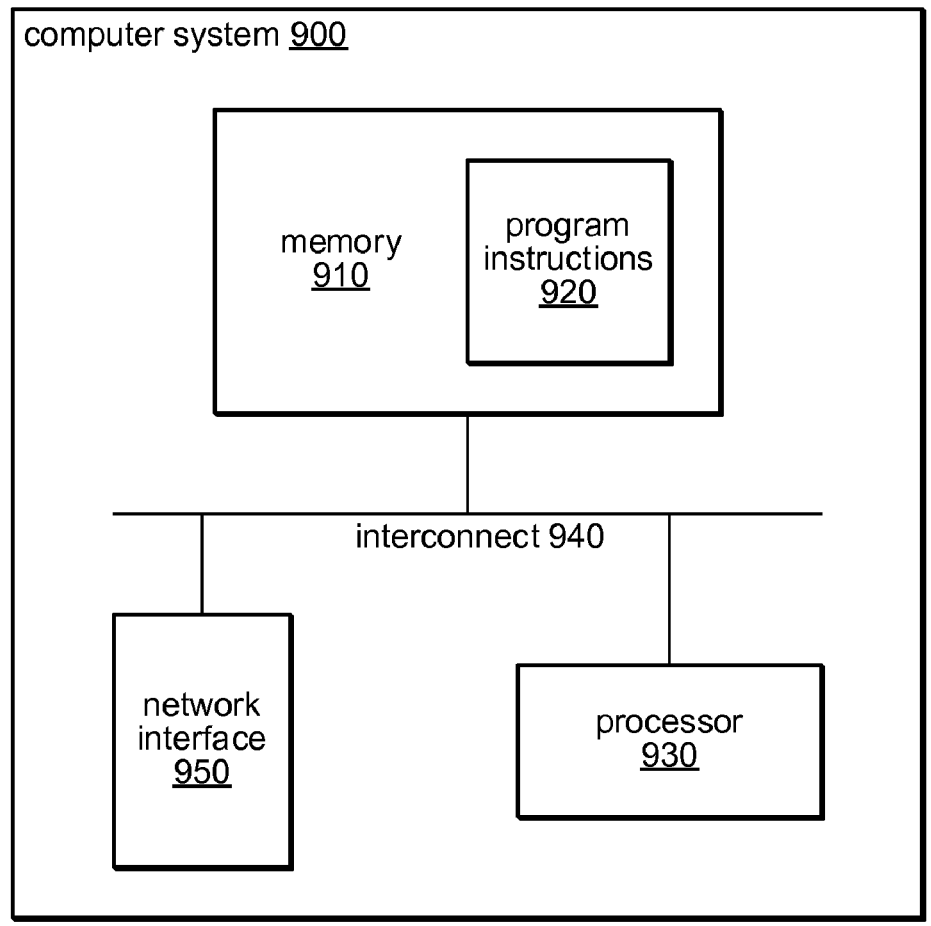
FIG. 9 illustrates a computing system capable of implementing an electronic filing system according to one embodiment.

FIG. 9 illustrates a computing system capable of implementing the various entities of FIG. 1, such as electronic filing system 100, user computer 110, user computer 150, tax preparation system 140, taxing authority 130, and user device 120, as described herein and according to various embodiments. Computer system 900 may be any of various types of devices, including, but not limited to, a personal computer system, desktop computer, laptop or notebook computer, mainframe computer system, handheld computer, workstation, network computer, a consumer device, mobile phone, personal digital assistant (PDA), smartphone, PDA phone, two-way paging device, application server, storage device, a peripheral device such as a switch, modem, router, or in general any type of computing device.

The electronic filing system described herein may be provided as a computer program product, or software, that may include a computer-readable storage medium having stored thereon instructions, which may be used to program a computer system (or other electronic devices) to implement an electronic filing system as described herein. A computer-readable storage medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions.

A computer system 900 may include a processor unit 930 (possibly including multiple processors, a single threaded processor, a multi-threaded processor, a multi-core processor, or other type of processor). The computer system 900 may also include one or more system memories 910 (e.g., one or more of cache, SRAM DRAM, RDRAM, EDO RAM, DDR RAM, SDRAM, Rambus RAM, EEPROM, or other memory type), an interconnect 940 (e.g., a system bus, LDT, PCI, ISA, or other bus type), and a network interface 950 (e.g., an ATM interface, an Ethernet interface, a Frame Relay interface, or other interface). The memory medium 910 may include other types of memory as well, or combinations thereof. Embodiments of the electronic filing system described herein may include fewer or additional components not illustrated in FIG. 9 (e.g., video cards, audio cards, storage devices, additional network interfaces, peripheral devices, or other components). The processor unit 930, the network interface 950, and the system memory 910 may be coupled to the interconnect 940. It should also be noted that one or more components of system 900 might be located remotely and accessed via a network. One or more of the system memories 910 may embody an electronic filing system 100.

Network interface 950 may be configured to enable computer system 900 to communicate with other computers, systems or machines, such as across networks 101, 102 and 103, described above. Networks 101, 102 and 103 may enable data communication between computer system 900 and among other entities illustrated in FIG. 1, such as user computer 110, user device 120, taxing authority 130, tax preparation system 140 and user computer 150, described above. Network interface 950 may use standard communications technologies and/or protocols. Networks 101, 102 and 103 may include, and network interface 950 may utilize, links using technologies such as Ethernet, 802.11, integrated services digital network (ISDN), digital subscriber line (DSL), and asynchronous transfer mode (ATM) as well as other communications technologies. Similarly, the networking protocols used on networks 101, 102, and 103 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 101, 102, and 103 by network interface 940 may be represented using technologies, languages, and/or formats, such as the hypertext markup language (HTML), the extensible markup language (XML), the simple object access protocol (SOAP), the wireless markup language (WML), and the extensible hypertext markup language (XHTML) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

Additionally, network 102 may be a wireless network such as a cellular network including GSM, CDMA, and TDMA networks. In addition, network 102 may be a wireless local area network (WLAN). Network 102 may be a wireless data network such as a general packet radio service (GPRS) network, an enhanced general packet radio service (EGPRS) network), or an enhanced data rates for GSM evolution (EDGE) network. Additionally, network 102 may be a combination of any networks described herein.

In one embodiment, network 102 may be the same network as network 101 (e.g., the Internet). In another embodiment, network 102 may be the same network as network 103 (e.g., the Internet). In yet another embodiment, network 101, network 102 and network 103 may be the same network (e.g., a WAN such as the Internet).

In some embodiments, memory 910 may include program instructions configured to implement an electronic filing system 100, as described herein. Electronic filing system 100 may be implemented in any of various programming languages or methods. For example, in one embodiment, electronic filing system 100 may be JAVA based, while in another embodiments, it may be implemented using the C or C++ programming languages or other programming languages.

While the electronic filing system has been described herein with reference to various embodiments, it will be understood that these embodiments are illustrative and that the scope of the electronic filing system is not limited to them. Many variations, modifications, additions, and improvements are possible. More generally, the present electronic filing system is described in the context of particular embodiments. For example, the blocks and logic units identified in the description are for ease of understanding and not meant to limit the electronic filing system to any particular embodiment. Functionality may be separated or combined in blocks differently in various realizations or described with different terminology. Please also note that in reference to the methods illustrated by FIGS. 2 and 3, the various actions and functionality described herein regarding those respective methods may be performed in different orders and the respective method may be implement using a different number of actions than illustrated in FIGS. 2 and 3.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the electronic filing system as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
a processor; and
a memory coupled to the processor, wherein the memory comprises program instructions executable by the processor to:
receive an unfiled tax return from a tax preparation application, wherein the unfiled tax return is associated with a user;
electronically file the unfiled tax return with a taxing authority;
receive an indication from the taxing authority of an error within the electronically filed tax return, wherein the indication of the error comprises an error code;
interpret the error code to generate an error notification;
send, by an electronic filing application executing on the processor, the error notification in a first Short Message Service (SMS) message to a user device associated with the user, wherein the error notification directs the user to download an error correction application onto the user device, and wherein the error correction application is configured to:
- execute on the user device to provide the user with an error correction interface;
- prompt, based on an error description in the error notification, the user to enter an error correction to the electronically filed tax return using the error correction interface external to the tax preparation application; and
- submit, to the electronic filing application, the error correction entered by the user using the error correction interface; and receive, by the electronic filing application, the error correction provided by the user.

2. The system of claim 1, wherein the error notification comprises an embedded reply-to address, wherein to receive said error correction comprises receiving a second SMS message sent from said user device to the embedded reply-to address, wherein the second SMS message comprises the error correction.

3. A computer-implemented method, comprising:
- receiving, by an electronic filing application executing on a hardware processor, an unfiled return from a preparation application, wherein the unfiled return is associated with a user;
- electronically filing, by the electronic filing application, the unfiled return with an authority;
- receiving, by the electronic filing application, an indication from the authority of an error within the electronically filed return, wherein the indication of the error comprises an error code;
- interpreting, by the electronic filing application, the error code to generate an error notification;
- sending, by the electronic filing application, the error notification in a first Short Message Service (SMS) message to a user device associated with the user, wherein the error notification directs the user to download an error correction application onto the user device, and wherein the error correction application is configured to:
  - execute on the user device to provide the user with an error correction interface;
  - prompt, based on an error description in the error notification, the user to enter an error correction to the electronically filed tax return using the error correction interface external to the tax preparation application; and
  - submit, to the electronic filing application, the error correction entered by the user using the error correction interface; and
- receiving, by the electronic filing application, the error correction provided by the user.

4. The computer-implemented method of claim 3, wherein the error notification comprises an embedded reply-to address, wherein to receive said error correction comprises receiving a second SMS message sent from said user device to the embedded reply-to address, wherein the second SMS message comprises the error correction.

5. The computer-implemented method of claim 3, wherein the return is a tax return and the authority is a taxing authority.

6. A method, comprising:
- using a preparation application to prepare an unfiled return;
- submitting, to an electronic filing application executing on a hardware processor, the unfiled return for electronic filing, wherein the unfiled return is submitted to an authority, wherein the authority sends an indication of an error within the electronically filed return, wherein the indication of the error comprises an error code interpreted, using the hardware processor, to generate an error notification for sending, by the electronic filing application, to a user device of the user in a first Short Message Service (SMS) message;
- receiving the error notification, wherein the error notification directs the user to download an error correction application onto the user device, wherein the error correction application is configured to:
  - execute on the user device to provide the user with an error correction interface;
  - prompt, based on an error description in the error notification, the user to enter an error correction to the electronically filed tax return using the error correction interface external to the tax preparation application; and
  - submit, to the electronic filing application, the error correction entered by the user using the error correction interface; and
- receiving, by the electronic filing application, the error correction provided by the user.

7. The method of claim 6, wherein the error notification comprises an error solution associated with the error of the submitted return, wherein the error solution indicates to the user a method of correcting the error.

8. The method of claim 7, wherein the error notification comprises an error description that indicates to the user the specific error to be corrected.

9. The method of claim 6, wherein said user receiving said error notification comprises the user receiving the error notification on the user device, wherein said user device is different than a device used to execute the preparation application.

10. The method of claim 6, wherein the error notification comprises an embedded reply-to address, wherein said user correcting said error comprises the user sending, using the user device, a second SMS message comprising an error correction to the embedded reply-to address.

11. The method of claim 6, wherein the return is a tax return and the authority is a taxing authority.

12. A non-transitory computer-readable storage medium, comprising program instructions computer-executable to implement:
- receiving an unfiled tax return from a tax preparation application, wherein the unfiled tax return is associated with a user;
- electronically filing the unfiled tax return with a taxing authority;
- receiving an indication from the taxing authority of an error within the electronically filed tax return, wherein the indication of the error comprises an error code;
- interpreting the error code to generate an error notification;
- sending, by an electronic filing application, the error notification in a first Short Message Service (SMS) message to a user device associated with the user, wherein the error notification directs the user to download an error correction application onto the user device, wherein the error correction application is configured to:
  - execute on the user device to provide the user with an error correction interface;
  - prompt, based on an error description in the error notification, the user to enter an error correction to the electronically filed tax return using the error correction interface external to the tax preparation application; and submit, to the electronic filing application, the error correction entered by the user using the error correction interface; and receiving, by the electronic filing application, the error correction provided by the user.

13. The non-transitory computer-readable storage medium of claim 12, wherein the error notification comprises an embedded reply-to address, wherein said receiving said error correction comprises receiving a second SMS message sent from said user device to the embedded reply-to address, wherein the second SMS message comprises the error correction.

* * * * *